(12) United States Patent
Rolston et al.

(10) Patent No.: US 11,953,737 B2
(45) Date of Patent: Apr. 9, 2024

(54) SYSTEMS AND METHODS FOR COUPLING LIGHT

(71) Applicant: Reflex Photonics, Inc., Kirkland (CA)

(72) Inventors: David Robert Rolston, Beaconsfield (CA); Mohammadreza Sanadgol Nezami, Montreal (CA); Shubhankar Mishra, Montreal (CA); Shanglin Li, Montreal (CA)

(73) Assignee: Smiths Interconnect Canada Inc., Kirkland (CA)

( * ) Notice: Subject to any disclaimer, the term of this patent is extended or adjusted under 35 U.S.C. 154(b) by 0 days.

(21) Appl. No.: 17/237,285

(22) Filed: Apr. 22, 2021

(65) Prior Publication Data

US 2021/0341688 A1 Nov. 4, 2021

Related U.S. Application Data

(60) Provisional application No. 63/018,639, filed on May 1, 2020.

(51) Int. Cl.
*G02B 6/42* (2006.01)
(52) U.S. Cl.
CPC ......... *G02B 6/4214* (2013.01); *G02B 6/4215* (2013.01)
(58) Field of Classification Search
CPC ...................................................... G02B 6/42
USPC .......................................................... 385/33
See application file for complete search history.

(56) References Cited

U.S. PATENT DOCUMENTS

| | | | | |
|---|---|---|---|---|
| 5,136,366 A | * | 8/1992 | Worp | H01L 23/3121 257/E23.125 |
| 5,155,786 A | * | 10/1992 | Ecker | G02B 6/4202 385/94 |
| 5,493,437 A | * | 2/1996 | Lebby | G08B 5/228 398/139 |
| 5,917,976 A | * | 6/1999 | Yamaguchi | G02B 6/4249 385/88 |

(Continued)

FOREIGN PATENT DOCUMENTS

| | | |
|---|---|---|
| EP | 1351082 A1 | 10/2003 |
| EP | 2762936 A1 | 8/2014 |

(Continued)

OTHER PUBLICATIONS

Liang, Chenyu, et al. "Mode partition noise mitigation for VCSEL-MMF links by using wavefront shaping technique." Research Article, Oct. 29, 2018, 10 pages, vol. 26, No. 22, Optics Express, Published on-line by OSA Publishing.

(Continued)

*Primary Examiner* — Kaveh C Kianni
(74) *Attorney, Agent, or Firm* — Armstrong Teasdale LLP (57) ABSTRACT

An optical ferrule connector is provided. The optical ferrule connector includes a body including a beveled surface, a plurality of optical fibers embedded in the body, each of the plurality of optical fibers extending along a transmission direction and terminating in a fiber tip that is oriented coplanar to the beveled surface, and a plurality of optical elements, each optical element of the plurality of optical elements located at an associated fiber tip of an associated optical fiber, each optical element operable to manipulate or otherwise focus light into or out of a core of the associated optical fiber.

18 Claims, 7 Drawing Sheets

(56) References Cited

U.S. PATENT DOCUMENTS

| | | | |
|---|---|---|---|
| 6,219,470 B1* | 4/2001 | Tu | G02B 6/4246 385/83 |
| 6,625,351 B2 | 9/2003 | Cox | |
| 6,748,137 B2 | 6/2004 | Wolak | |
| 6,910,812 B2* | 6/2005 | Pommer | G02B 6/4201 385/24 |
| 7,197,224 B2 | 3/2007 | Rolston et al. | |
| 7,533,457 B2* | 5/2009 | Foehringer | H01L 24/97 29/840 |
| 7,775,725 B2 | 8/2010 | Grinderslev | |
| 7,850,372 B2 | 12/2010 | Nishimura et al. | |
| 9,063,313 B1* | 6/2015 | Hasharoni | G02B 6/43 |
| 9,644,234 B2* | 5/2017 | Pipper | H05B 3/0038 |
| 2002/0097957 A1* | 7/2002 | Kikuchi | G02B 6/327 385/33 |
| 2002/0131699 A1* | 9/2002 | Raguin | G02B 6/322 385/33 |
| 2003/0201462 A1* | 10/2003 | Pommer | G02B 6/4259 257/200 |
| 2004/0021214 A1* | 2/2004 | Badehi | G02B 6/4246 257/690 |
| 2004/0067015 A1* | 4/2004 | Nakajima | G02B 3/0018 385/33 |
| 2005/0018974 A1* | 1/2005 | Rolston | G02B 6/4214 385/83 |
| 2005/0046016 A1* | 3/2005 | Gilleo | H01L 23/055 257/713 |
| 2005/0205771 A1* | 9/2005 | Sherrer | G02B 6/4257 250/239 |
| 2009/0140277 A1* | 6/2009 | Wang | H01L 33/60 257/E33.001 |
| 2013/0094864 A1* | 4/2013 | Duis | H04B 10/40 398/139 |
| 2013/0182998 A1* | 7/2013 | Andry | G02B 6/4204 385/33 |
| 2013/0207083 A1* | 8/2013 | Young | H01L 51/5246 257/40 |
| 2013/0314707 A1* | 11/2013 | Shastri | G01B 11/14 356/399 |
| 2014/0294339 A1* | 10/2014 | Lagziel | G02B 6/2804 385/14 |
| 2016/0238789 A1* | 8/2016 | Lagziel | G02B 6/125 |
| 2019/0187162 A1* | 6/2019 | Shastry | A61B 10/0051 |
| 2019/0384007 A1* | 12/2019 | Matiss | G02B 6/1225 |
| 2020/0003973 A1 | 1/2020 | Li et al. | |
| 2020/0028000 A1* | 1/2020 | Wang | H01L 31/09 |
| 2020/0103597 A1 | 4/2020 | Watanabe et al. | |

FOREIGN PATENT DOCUMENTS

| | | | |
|---|---|---|---|
| JP | H04104107 A | 4/1992 | |
| WO | WO-02075407 A1 * | 9/2002 | G02B 6/322 |

OTHER PUBLICATIONS

Ribeiro, Rita S. Rodrigues et al. "Fabrication of Fresnel plates on optical fibres by FIB milling for optical trapping, manipulation and detection of single cells." Research Article, Jun. 30, 2017, 14 pages, vol. 7.1 (2017): 4485, Scientific Reports, Published on-line by nature.com.

European Search and Examination Report, EP Application No. 21170287.3, dated Oct. 6, 2021.

W. Royall Cox, et al., "Microjet Printing of Micro-Optical Interconnects", Int. J. of Microcircuits & Elect. Packaging, vol. 23, No. 3, pp. 346-351, 3rd Quarter 2000.

"Microplotter Proto", Retrieved from Internet: https://www.sonoplot.com/microplotter-proto.

"Micro Optic", Retrieved from Internet: https://www.broadcom.com/products/fiber-optic-modules-components/components-broadband/micro-optics.

"Advantages of Fresnel Lenses", Retrieved from Internet: https://www.edmundoptics.com/knowledge-center/application-notes/optics/advantages-of-fresnel-lenses.

"Lensed Fibers", Samuel Kassey, Retrieved from Internet: https://laseoptics.com/lensed-fibers/.

"Datacon 2200 evo", Retrieved from Internet: https://www.besi.com/products-technology/product-details/product/datacon-2200-evo.

European Examination Report, Application No. 21170287.3, dated Nov. 22, 2023, 6 pps.

* cited by examiner

SYSTEMS AND METHODS FOR COUPLING LIGHT

CROSS-REFERENCE TO RELATED APPLICATIONS

This patent application claims priority to U.S. Provisional Patent Application No. 63/018,639 filed on May 1, 2020, the disclosure of which is hereby incorporated by reference herein in its entirety as part of the present application.

BACKGROUND

The embodiments described herein relate generally to optical communication systems, and more particularly, to coupling light into and out of optical fibers.

Light emitted, absorbed, and/or altered by optoelectronic devices, such as photodetectors, light emitting diodes, lasers, vertical cavity surface emitting lasers (VCSELs), etc., may be coupled into optical waveguides, such as optical fibers, planar waveguides, etc., which can be further coupled to conventional optical connector types.

An optoelectronic chip, containing a device such as a VCSEL, is typically mounted in an electronic package, with the direction of the light from the VCSEL being emitted perpendicular (i.e., normal) to the surface of both the chip itself and the surface on which the electronic package has been placed. Because the light from the VCSEL is emitted perpendicular, in at least some known systems, an optical ferrule connector is used to redirect the emitted light from the VCSEL into optical fibers extending a direction parallel to the surface of the chip. The light may be transmitted through the optical fibers to other optical devices.

At least some known optical ferrule connectors include a plurality of optical fibers embedded in a block of material (e.g., silicon). The block and embedded optical fibers are polished at, for example, a 45° angle to generate a beveled surface. The beveled surface facilitates redirecting the light emitted from the VCSEL into the plurality of optical fibers. However, at least some known optical ferrule connectors successfully couple only a fraction of the light emitted from the VCSEL into the plurality of optical fibers. Accordingly, it would be desirable to provide an optical ferrule connector that efficiently couples substantially all of the light emitted from a VSCEL into a plurality of optical fibers.

BRIEF SUMMARY

In one aspect, an optical ferrule connector is provided. The optical ferrule connector includes a body including a beveled surface, a plurality of optical fibers embedded in the body, each of the plurality of optical fibers extending along a transmission direction and terminating in a fiber tip that is oriented coplanar to the beveled surface, and a plurality of optical elements, each optical element of the plurality of optical elements located at an associated fiber tip of an associated optical fiber, each optical element operable to manipulate or otherwise focus light into or out of a core of the associated optical fiber.

In another aspect, an optical coupling system is provided. The optical coupling system includes an optical device configured to emit light, and an optical ferrule connector positioned proximate the optical device. The optical ferrule connector includes a body including a beveled surface, a plurality of optical fibers embedded in the body, each of the plurality of optical fibers extending along a transmission direction and terminating in a fiber tip that is oriented coplanar to the beveled surface, and a plurality of optical elements, each optical element of the plurality of optical elements located at an associated fiber tip of an associated optical fiber, each optical element operable to focus the light emitted from the optical device into a core of the associated optical fiber.

In yet another aspect, a method of fabricating an optical ferrule connector is provided. The method includes embedding a plurality of optical fibers in a block, machining the block and plurality of optical fibers to generate a beveled surface on the block and to generate a fiber tip on each of the plurality of optical fibers, each of the fiber tips coplanar with the beveled surface, and fabricating an optical element at each fiber tip, each optical element operable to manipulate or otherwise focus light into or out of a core of an associated optical fiber.

DETAILED DESCRIPTION

The present disclosure is directed to an optical ferrule connector. The optical ferrule connector includes a body including a beveled surface, a plurality of optical fibers embedded in the body, each of the plurality of optical fibers extending along a transmission direction and terminating in a fiber tip that is oriented coplanar to the beveled surface, and a plurality of optical elements, each optical element of the plurality of optical elements located at an associated fiber tip of an associated optical fiber, each optical element operable to focus light into a core of the associated optical fiber.

Figure 1:
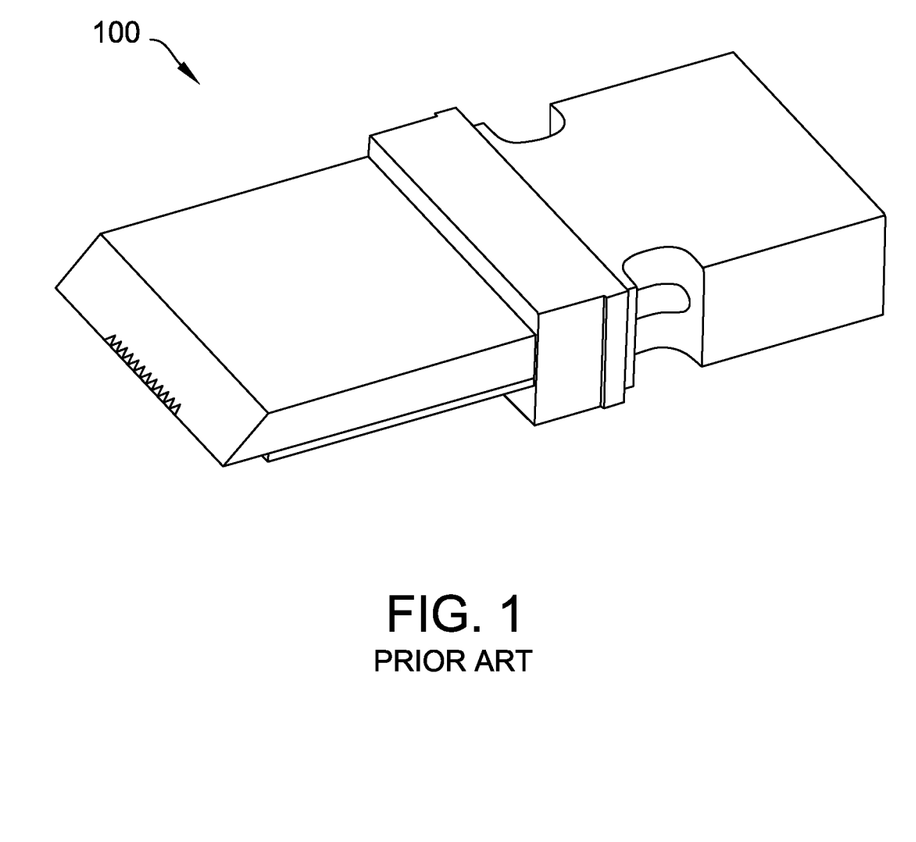
FIG. 1 is a perspective view of a known optical ferrule connector.
Figure 2:
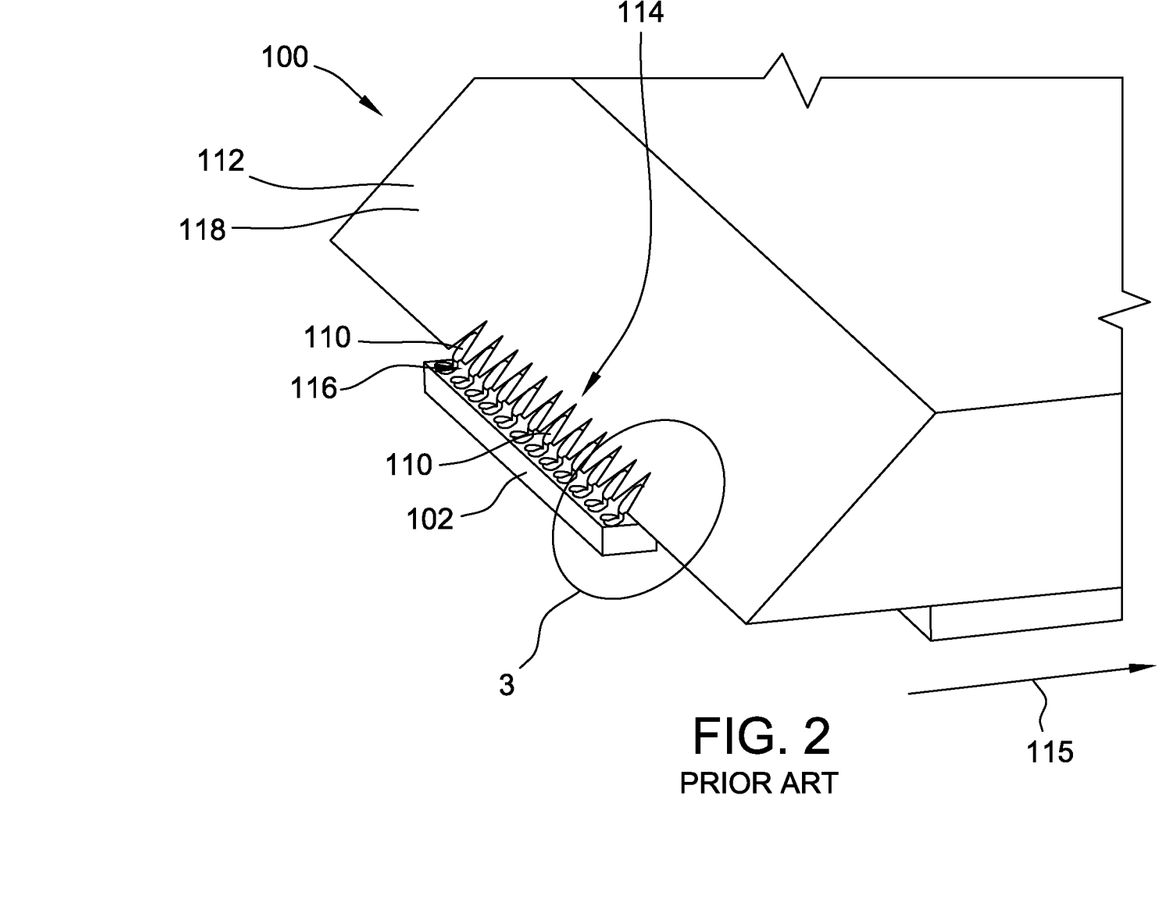
FIG. 2 is a perspective view of an enlarged portion of the known optical ferrule connector shown in FIG. 1 and a vertical cavity surface emitting laser (VCSEL).

Turning now to the figures, FIG. 1 is s perspective view of a known optical ferrule connector 100. FIG. 2 is a perspective view of an enlarged portion of known optical ferrule connector 100 and a vertical cavity surface emitting laser (VCSEL) 102. Further, FIG. 3 is a cross-sectional view of area 3 (shown in FIG. 2) of known optical ferrule connector 100 and VCSEL 102.

As shown best in FIG. 2, known optical ferrule connector 100 includes a plurality of optical fibers 110 embedded in a block 112. Block 112 may be fabricated from, for example, silicon. Specifically, each optical fiber 110 is positioned in a precision anisotropically etched v-shaped groove structure 114 defined in block 112, and each optical fiber 110 extends along a transmission direction 115. Known optical ferrule connector 100 includes twelve optical fibers 110 and twelve v-shaped groove structures 114.

Further, each optical fiber 110 terminates in a fiber tip 116 at a beveled face 118 of block 112. Beveled face 118 is oriented at an angle 120 of approximately 45° relative to transmission direction 115 (although other angles may also be used). To form fiber tips 116 and beveled face 118, block 112 (with embedded optical fibers 110) is polished (or machined using other methods) at angle 120.

Figure 3:
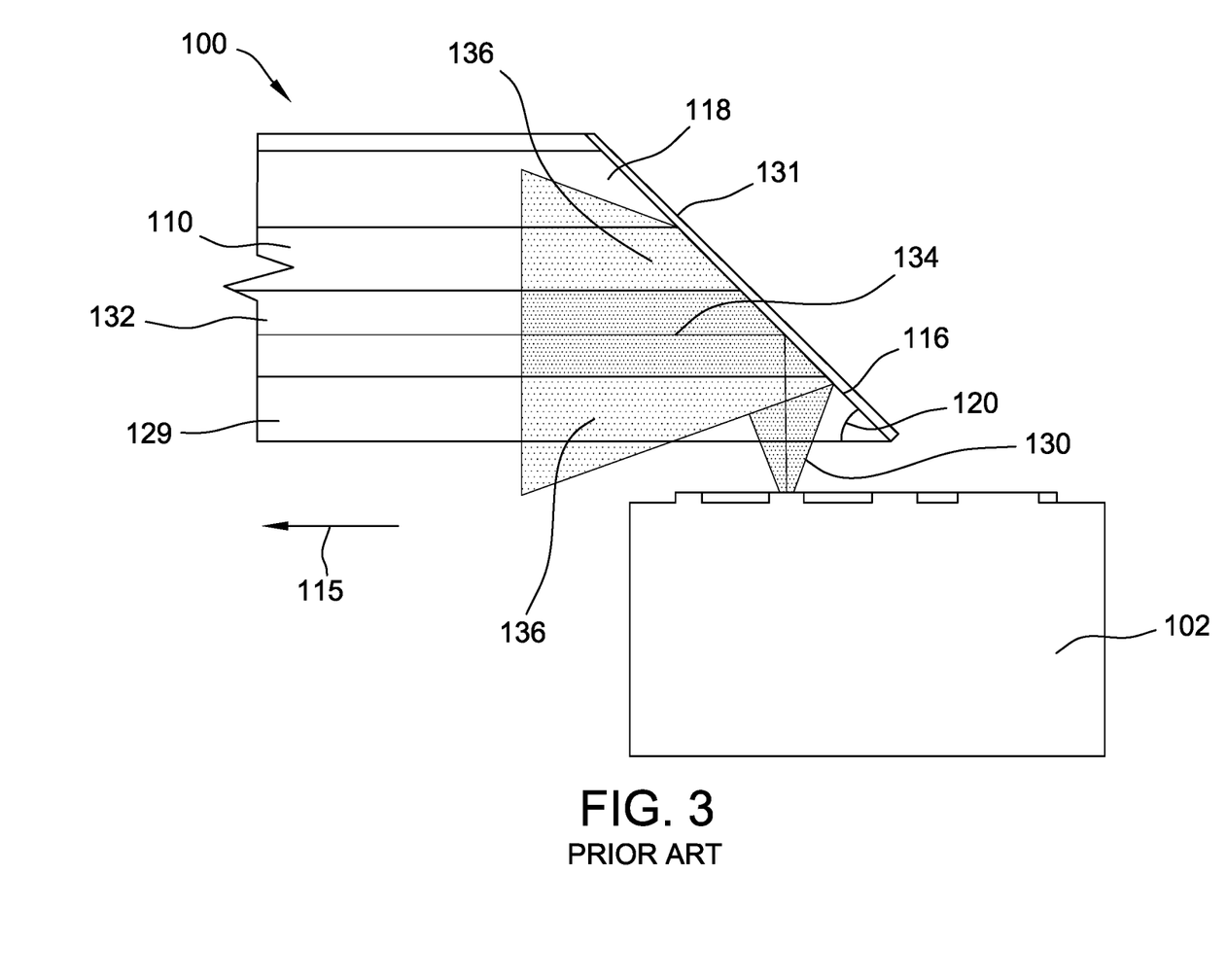
FIG. 3 is a cross-sectional view of area 3 (shown in FIG. 2) of the known optical ferrule connector and VCSEL shown in FIG. 1.

FIG. 3 illustrates coupling light 130 emitted from VCSEL 102 into optical fibers 110. As shown in FIG. 3, beveled face 118 and fiber tips 116 are coated with a reflective material 131 (e.g., gold or silver). Reflective material 131 is omitted from FIGS. 1 and 2 for clarity.

As shown in FIG. 3, optical fiber 110 includes a cladding 129 surrounding a core 132. Core 132 may have a diameter of, for example, 50 microns. Light 130 emitted from VCSEL 102 enters optical fiber 110 sideways through cladding 129, and reflects off of reflective material 131 to be redirected in transmission direction 115. Notably, light 130 diverges as it exits VCSEL 102. Accordingly, light 130 continues to diverge after reflecting off of reflective material 131. This results in a central portion 134 of light 130 being directed into core 132. However, outer portions 136 of light 130 fall outside core 132, and accordingly will not be transmitted by optical fiber 110.

To try to capture as much light 130 as possible, in known optical ferrule connector 100, core 132 is generally positioned as close as possible to VCSEL 102 to reduce the distance over which light 130 can diverge. Further, light 140 may not be uniform across an aperture of VCSEL 102, impacting the quality of the optical signal coupled to core 132. For example, when a higher percentage of light is on the outside of the diverging light 130, a lower amount of light will be coupled into core 132. Further, an uneven distribution of optical power across a cross-section of diverging light 130 and/or clipping of higher-angled modes of light 130 that are not successfully coupled into core 132 may increase the risk of having a limited optical extinction ratio (i.e., the ratio of high power to low power).

The divergence of light 130 with known optical ferrule connector 100 may also cause issues downstream. For example, after traveling along optical fiber 110, light 130 will diverge when it exits optical fiber 110, causing a significant amount of light to fall outside of a target optical device (e.g., a photodiode). This problem is further exacerbated at higher data rates, for which downstream photodiodes are generally smaller to realize lower capacitances and higher operating speeds.

The optical ferrule connector disclosed herein addresses many of the issues associated with known optical ferrule connector 100, as described in detail herein. Specifically, the optical ferrule connector disclosed herein uses a plurality of microlenses (or other optical elements) to aid in coupling light from a VCSEL (or other optical device) into a plurality of optical fibers (generally, an optical waveguide). As described herein, the optical elements are placed onto tips of the optical fibers, and facilitate coupling light into the core of each fiber. By selecting an appropriate numerical aperture, focal length, index of refraction, wavelength, etc., to form appropriate microlenses (or other optical elements) enables realizing a substantially higher coupling percentage than known optical ferrule connector 100. Similar techniques may also be used in reverse to couple light from an optical waveguide into another optical device (e.g., a photodetector or another type of optical waveguide).

Figure 4:
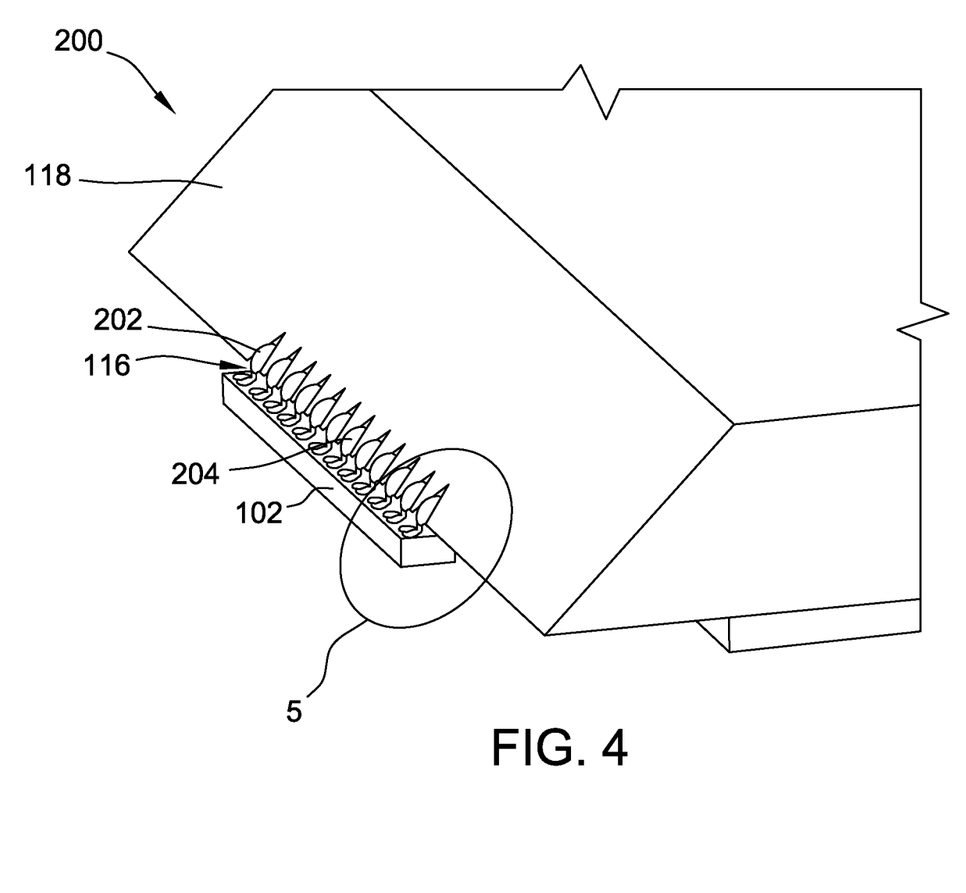
FIG. 4 is a perspective view of a portion of an exemplary embodiment of an optical ferrule connector and a VCSEL.
Figure 5:
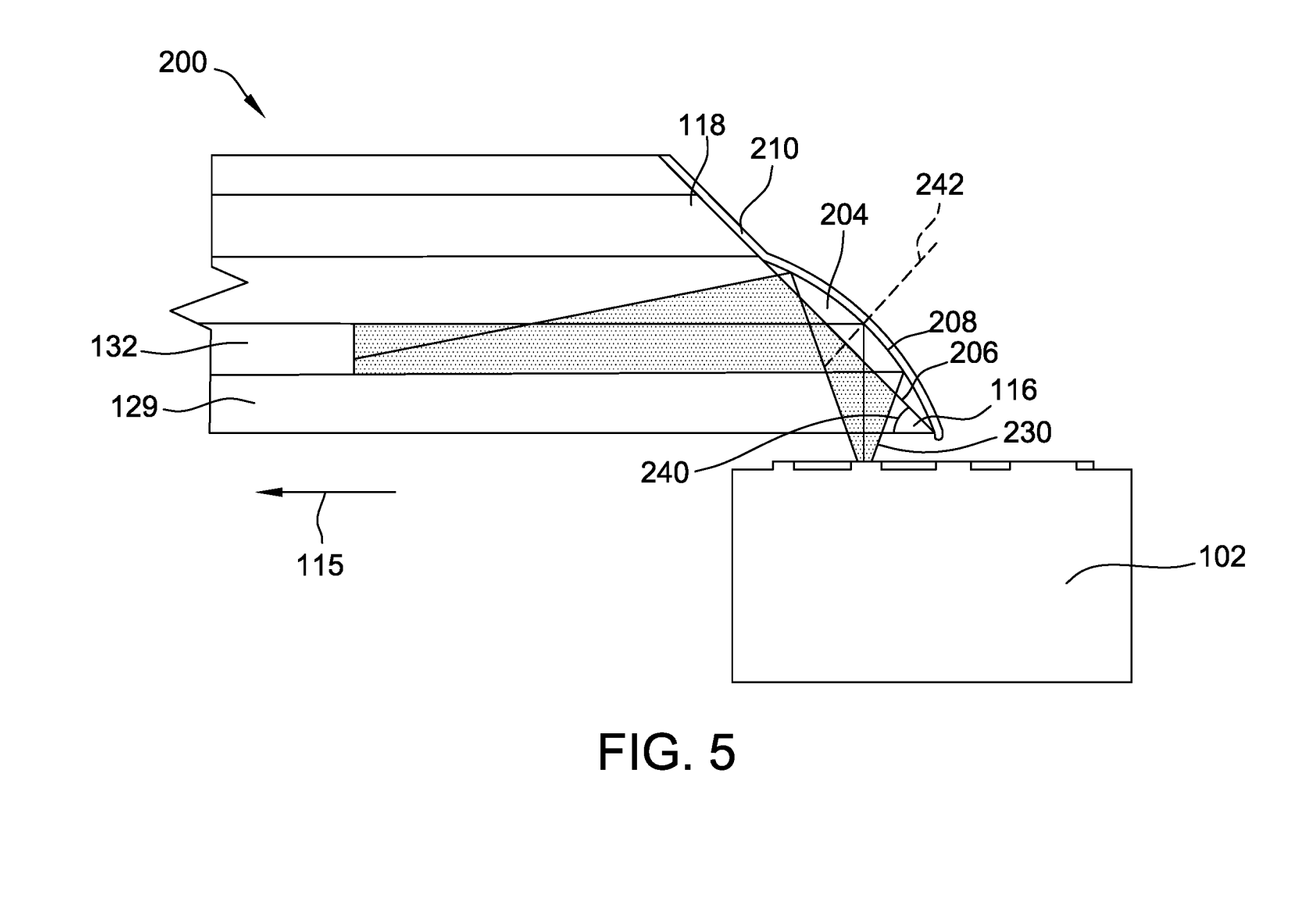
FIG. 5 is a cross-sectional view of area 5 (shown in FIG. 4) of the optical ferrule connector and VCSEL shown in FIG. 4.

FIG. 4 is a perspective view of a portion of an exemplary embodiment of an optical ferrule connector 200 and a VCSEL 102. Further, FIG. 5 is a cross-sectional view of area 5 (shown in FIG. 4) of optical ferrule connector 200 and VCSEL 102. Relative to known optical ferrule connector 200, like components in optical ferrule connector 200 are labeled with the same reference numerals.

As shown in FIGS. 4 and 5, in optical ferrule connector 200, an optical element 202 is fabricated on each fiber tip 116. As used herein, fabricating optical elements 202 may include placing, depositing, transferring, etching, and/or printing optical elements 202 such that optical ferrule connector 200 functions as described herein. In this embodiment, each optical element 202 is a concave microlens 204. Alternatively, optical elements 202 may be any optical elements that enable optical ferrule connector 200 to function as described herein.

As shown best in FIG. 5, each microlens 204 includes a flat surface 206 and a convex surface 208. In this embodiment, flat surface 206 is substantially coplanar with the surface of fiber tip 116 and beveled face 118. Accordingly, microlens 204 extends outward from beveled face 118.

In the embodiment shown in FIGS. 4 and 5, a reflective material 210 is applied to beveled face 118 and microlens 204. Accordingly, reflective material 210 covers convex surface 208 of microlens 204. Reflective material 210 is similar to reflective material 131 and may be, for example, gold or silver. In some embodiments, reflective material 210 includes a dielectric coating.

As shown in FIG. 5, light 230 emitted from VCSEL 102 begins to diverge and enters optical fiber 110 sideways through cladding 129. However, in contrast to known optical ferrule connector 100, instead of reflecting off of reflective material 131 at the termination of fiber tips 116, light 230 instead passes through flat surface 206 and enters microlens 204. Subsequently, light 230 reaches convex surface 208 of microlens 204 and reflects off of reflective material 210 at convex surface 208.

Because of the structure of microlens 204, instead of continuing to diverge, light 230 reflected from reflective material 210 is focused towards core 132, resulting in a relatively large percentage of light 230 being coupled from VCSEL 102 into core 132. If reflective material 210 is omitted, at least some of light 230 may still be reflected (due to total internal reflection within microlens 204) and directed into core 132. However, including reflective material 210 will generally result in a larger portion of light 230 being directed into core 132.

In the exemplary embodiment, fiber tips 116, beveled face 118, and flat surface 206 are oriented at approximately 45° relative to transmission direction 115. Alternatively, fiber tips 116, beveled face 118, and flat surface 206 are oriented at any suitable angle 240 relative to transmission direction 115. For example, other angles may enable mode-tuning or selecting particular portions of light 230. Because of the orientation of microlens 204, light 230 enters microlens 204 off-axis (i.e., non-parallel to an optical axis 242 of microlens 204).

In the exemplary embodiment, fibers tips 116 and beveled face 118 are prepared initially (e.g., by polishing block 112 with embedded optical fibers 110, as described above). Notably, block 112 and optical fibers 110 may be machined using any suitable technique (e.g., polishing, cleaving, later cutting, etc.). Subsequently, each microlens 204 is deposited on a respective fiber tip 116 as a curable liquid and/or epoxy, leaving a curved surface that forms convex surface 208 after hardening. This results in convex surface 208 being curved in all directions. The concavity of convex surface 208 may be controlled based on the viscosity, temperature, and/or material of the deposited liquid, as well as how the liquid is deposited in a paired step sequence of deposition and hardening. Regardless, the deposited liquid should be capable of optically transmitting the wavelength of light 230. Alternatively, microlens 204 may be positioned on fiber tips 116 using any technique that enables optical ferrule connector 200 to function as described herein.

In the exemplary embodiment each microlens 204 is deposited as a small droplet (or series of micro drops) on the respective fiber tip 116. This may be accomplished using a machine capable of precision placement of dispensed material, such as a microplotter. In another example, the material may be precision stamped by transferring the material from a reservoir using a precisely shaped tool (e.g., using a pick and place machine with a micro epoxy stamper). The ultimate shape of the applied liquid material may also provide mechanical benefits at the application site. For example, a ring, edge, and/or lip may help to confine a natural capillary motion of the liquid. After curing, in the exemplary embodiment, microlenses 204 are coated in reflective material 210. In some embodiments, reflective material 210 may be a dielectric coating.

In known applications, microlens structures are typically set on transparent plates, and the lenses are deposited as liquids or wafer-level etched using photoresists and chemical etching, or dry plasma etching methods. However, these structures always require a substrate that acts as a carrier for the very small lens features. Microlenses on substrates would not be transferrable to the beveled fiber tips 116 described herein, at least because offsets in distance due to the substrates would position the microlenses poorly with respect to both VCSEL 102 and optical fibers 110.

As explained above, light 230 follows a somewhat similar path through optical ferrule connector 200 as light 130 through known optical ferrule connector 100. However, instead of light 130 reflecting off a flat surface at reflective material 131, light 230 passes into microlens 204 and reflects off reflective material 210 at convex surface 208, focusing more light into core 132.

In the embodiment shown in FIGS. 4 and 5, optical element 202 is a microlens 204. In alternatively embodiments, other optical elements may be used to achieve similar functionality.

Figure 6:
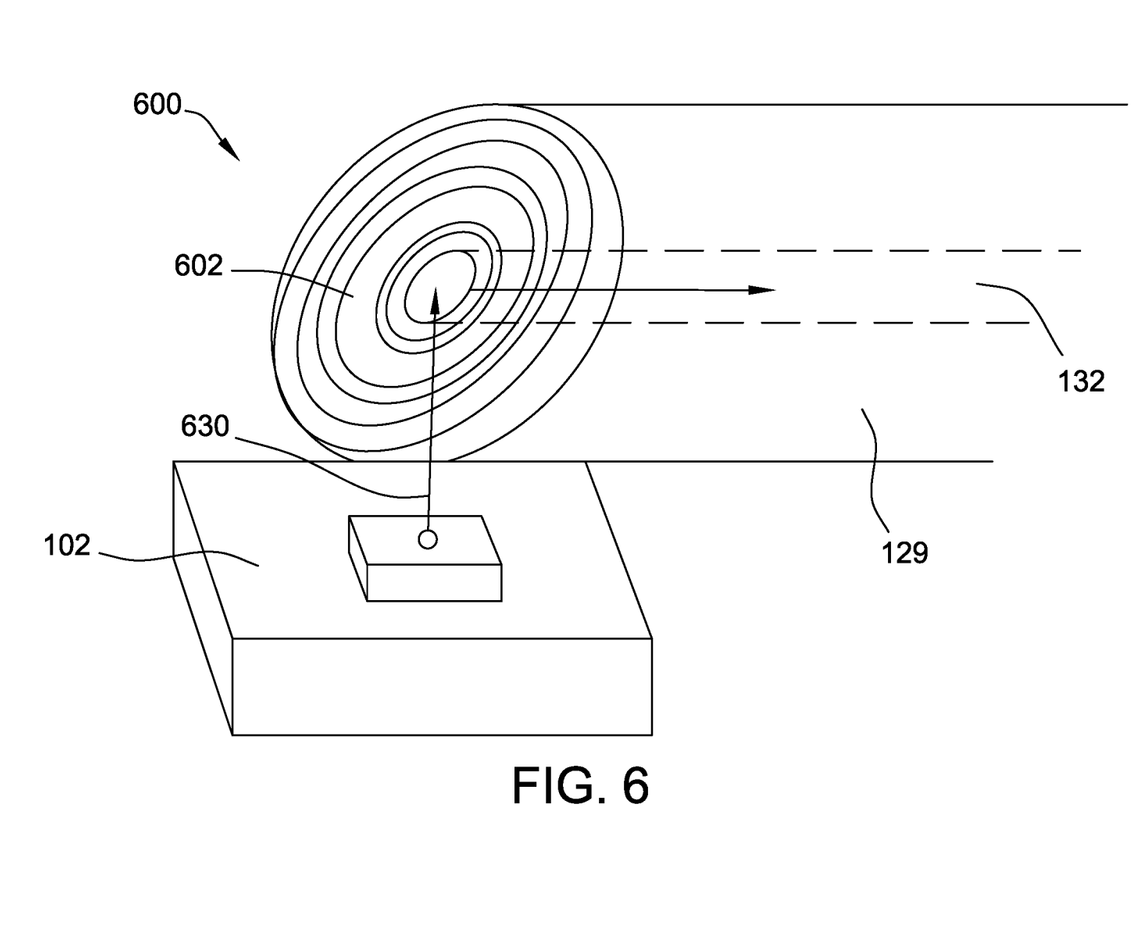
FIG. 6 is schematic diagram of an alternative optical ferrule connector.

For example, in some embodiments, diffractive patterns or photonic crystal surfaces may be placed on fiber tips 116. For example, FIG. 6 is schematic diagram of an alternative optical ferrule connector 600. Instead of a microlens, alternative optical ferrule connector 600 includes a mirror 602 with a diffractive pattern (e.g., a Fresnel-like pattern) to redirect light 630 emitted from VCSEL 102 into core 132.

Further, in some embodiments, individual fiber tips 116 may have single or multi-level etched grooves to provide additional optical, modal, or spectral filtering. Beam forming and shaping can also be realized through holographic imaging in some embodiments. These implementations may not only aid in better focusing the light, but may also adjust modal content of the light to match the laser output from the VCSEL to the optical waveguide, resulting in more even propagation velocities and mitigated dispersion effects, and allowing the light pulses to travel further distances through the optical waveguide.

One diffractive structure that is effective at focusing light is the Fresnel pattern of concentric rings. This pattern may be applied to fiber tips 116. Because of the off-axis entry of the light, however, an etching angle of the pattern relative to the direction of light propagation may require more complicated patterns.

Fabricating diffractive optical elements may differ then fabricating microlenses, as described above. For example, diffractive optical elements may be fabricated using additive or subtractive techniques, and such optical elements may function with both metallic and air interfaces at fiber tips 116. One possible fabrication method may include ion or e-beam etching the diffractive patterns directly onto each fiber tip 116. Another fabrication method may include depositing very fine materials (such as epoxies or photoresists) directly onto fiber tips 116, with patterns created from binary level bit maps.

In addition, in some embodiments, microlenses and diffractive patterns may be combined to over provide additional three-dimensional optical tuning and geometries. Such embodiments may include fabricating the microlenses first and the diffractive patterns second, or vice versa. Further, such embodiments may or may not use a reflective material.

Figure 7:
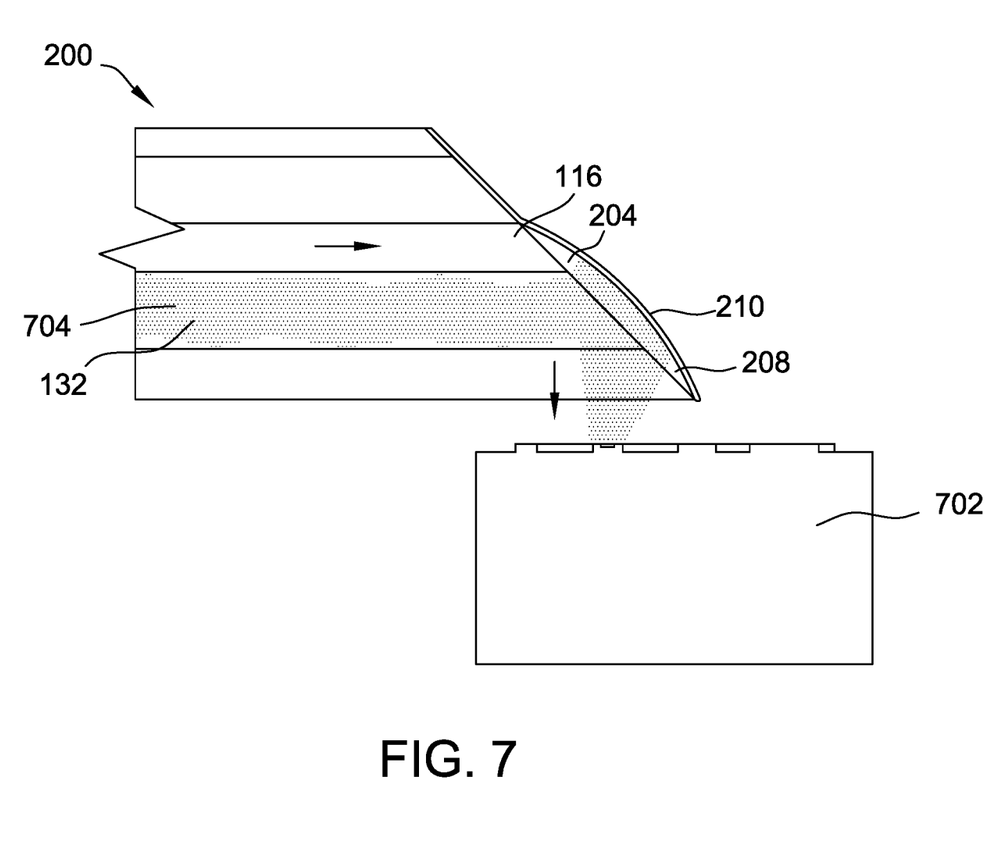
FIG. 7 is a cross-sectional view of the optical ferrule connector shown in FIGS. 4 and 5 and a target optical device.

As noted above, the systems and methods described herein may also be used to couple light from an optical waveguide into a downstream optical device. For example, FIG. 7 is a cross-sectional view of optical ferrule connector 200 that illustrates using optical ferrule connector 200 to couple light into a target optical device 702 (e.g., a photodiode). As shown in FIG. 7, light 704 travels along core 132, exits fiber tip 116 and enters microlens 204, and is reflected off reflective material 210 at convex surface 208 to focus light 704 into target optical device 702.

The embodiments described herein improve upon known optical ferrule connectors by increasing the amount of optical power that can be coupled into or out of an optical waveguide (e.g., an optical fiber). This provides significant advantages (e.g., at higher power couplings) while still providing the same benefits and reliability of known optical ferrule connectors.

Exemplary embodiments of methods and systems for optical coupling are described above in detail. The methods and systems are not limited to the specific embodiments described herein, but rather, components of systems and/or steps of the methods may be used independently and separately from other components and/or steps described herein. Accordingly, the exemplary embodiment can be implemented and used in connection with many other applications not specifically described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An optical ferrule connector comprising:
   a body comprising a beveled surface;
   a plurality of optical fibers embedded in said body, each of said plurality of optical fibers extending along a transmission direction and terminating in a fiber tip that is oriented coplanar to said beveled surface; and a plurality of optical elements, each optical element of said plurality of optical elements located at an associated fiber tip of an associated optical fiber, each optical element operable to focus light into or out of a core of said associated optical fiber, at least one of the optical elements comprising a mirror with a concentric ring pattern.

2. The optical ferrule connector of claim 1, further comprising a reflective material covering at least one of said plurality of optical elements.

3. The optical ferrule connector of claim 1, wherein at least one of said plurality of optical elements comprises a microlens.

4. The optical ferrule connector of claim 1, wherein said microlens comprises:
a flat surface contacting said associated fiber tip; and
a convex surface opposite said flat surface.

5. The optical ferrule connector of claim 4, further comprising a reflective material covering said convex surface of said microlens.

6. The optical ferule connector of claim 1, wherein each of said plurality of optical elements is oriented to receive light at an off-axis angle.

7. The optical ferrule connector of claim 1, wherein said beveled surface is oriented at substantially 45° relative to the transmission direction.

8. An optical coupling system comprising:
an optical device configured to emit light; and
an optical ferrule connector positioned proximate said optical device, said optical ferrule connector comprising:
a body comprising a beveled surface;
a plurality of optical fibers embedded in said body, each of said plurality of optical fibers extending along a transmission direction and terminating in a fiber tip that is oriented coplanar to said beveled surface; and
a plurality of optical elements, each optical element of said plurality of optical elements located at an associated fiber tip of an associated optical fiber, each optical element operable to focus the light emitted from said optical device into a core of said associated optical fiber, at least one of the optical elements comprising a mirror with a concentric ring pattern.

9. The optical coupling system of claim 8, wherein said optical device comprises a vertical cavity surface emitting laser (VCSEL).

10. The optical coupling system of claim 8, further comprising a reflective material covering at least one of said plurality of optical elements.

11. The optical coupling system of claim 8, wherein at least one of said plurality of optical elements comprises a microlens.

12. The optical coupling system of claim 8, wherein said microlens comprises:
a flat surface contacting said associated fiber tip; and
a convex surface opposite said flat surface.

13. The optical coupling system of claim 12, further comprising a reflective material covering said convex surface of said microlens.

14. The optical coupling system of claim 8, wherein each of said plurality of optical elements is oriented to receive light at an off-axis angle.

15. The optical coupling system of claim 8, wherein said beveled surface is oriented at substantially 45° relative to the transmission direction.

16. A method of fabricating an optical ferrule connector, said method comprising:
embedding a plurality of optical fibers in a block;
machining the block and plurality of optical fibers to generate a beveled surface on the block and to generate a fiber tip on each of the plurality of optical fibers, each of the fiber tips coplanar with the beveled surface; and
fabricating an optical element at each fiber tip, each optical element operable to focus light into or out of a core of an associated optical fiber, at least one of the optical elements comprising a mirror with a concentric ring pattern.

17. The method of claim 16, wherein fabricating an optical element comprises depositing a curable material on at least one fiber tip to form a microlens.

18. The method of claim 16, further comprising applying a reflective material to the beveled surface and the optical elements.

* * * * *